United States Patent [19]
Horiguchi et al.

[11] Patent Number: 4,621,367
[45] Date of Patent: Nov. 4, 1986

[54] SIGNAL LEVEL COMPENSATION IN AN IN-LINE DATA COMMUNICATION SYSTEM

[75] Inventors: Michiyuki Horiguchi, Nara; Yoshimitsu Matsui, Kashihara; Masakazu Ohashi, Kyoto, all of Japan

[73] Assignee: Sharp Kabushiki Kaisha, Osaka, Japan

[21] Appl. No.: 517,275

[22] Filed: Jul. 26, 1983

[30] Foreign Application Priority Data

Jul. 31, 1982 [JP] Japan .................. 57-133997

[51] Int. Cl.[4] .............................. H04B 3/00
[52] U.S. Cl. ........................ 375/36; 370/26; 379/344
[58] Field of Search ............... 375/3, 8, 36, 7; 333/144; 370/24, 32, 29, 97, 26; 179/170, 170 K, 2 C, 2 DP, 170.2; 455/78; 330/84, 124 R

[56] References Cited

U.S. PATENT DOCUMENTS

| | | | |
|---|---|---|---|
| 3,237,164 | 2/1966 | Evans | 375/36 |
| 3,308,392 | 3/1967 | McCarter | 330/144 |
| 3,499,985 | 3/1970 | Rowlands et al. | 370/97 |
| 3,586,793 | 6/1971 | Neal | 179/170.2 |
| 3,660,599 | 5/1972 | Wiedmann | 370/29 |
| 3,827,026 | 7/1974 | Viswanathan | 375/36 |
| 3,969,683 | 7/1976 | Fabricius | 330/144 |
| 3,988,675 | 10/1976 | Dykas | 455/78 |
| 4,091,380 | 5/1978 | Yu | 330/144 |
| 4,095,183 | 6/1978 | Kakigi | 455/78 |
| 4,101,734 | 7/1978 | Dao | 375/36 |
| 4,154,978 | 5/1979 | Tu | 370/26 |
| 4,246,582 | 1/1981 | Kondo et al. | 370/32 |
| 4,398,298 | 8/1983 | Van Egmond et al. | 375/36 |
| 4,404,672 | 9/1983 | Shimizu | 370/29 |
| 4,450,571 | 5/1984 | Hirayama et al. | 370/24 |

Primary Examiner—Robert L. Griffin
Assistant Examiner—Stephen Chin
Attorney, Agent, or Firm—Birch, Stewart, Kolasch & Birch

[57] ABSTRACT

An in-line data communication system includes a bidirectional communication cable for connecting at least two terminal stations. A signal level compensation circuit is connected to the bidirectional communication cable for compensating for signal attenuation in the bidirectional communication cable. The signal level compensation circuit includes first and second amplifying circuits connected to each other in a parallel fashion. When a data signal is transmitted in one direction in the bidirectional communication cable, the first amplifying circuit is enabled and the second amplifying circuit is disabled. When the data signal is transmitted in the opposing direction, the first amplifying circuit is disabled and the second amplifying circuit is enabled.

1 Claim, 4 Drawing Figures

SIGNAL LEVEL COMPENSATION IN AN IN-LINE DATA COMMUNICATION SYSTEM

BACKGROUND AND SUMMARY OF THE INVENTION

The present invention relates to an in-line data comunication system, wherein terminal stations are connected to each other via a bidirectional communication cable.

In such an in-line data communication system, signal attenuation creates a serious problem when a long communication cable is used to connect long-distanced terminal stations. The signal attenuation is mainly caused by the impedance of the communication cable. To reduce the signal attenuation, one approach of the conventional system is to employ a communication cable of low impedance. Such a communication cable makes the system expensive. Another approach in the conventional system is to employ two communication cables, one for data transmission and the other for data reception. Amplifying circuits are connected to the transmission cable and the reception cable, respectively. This complicates the construction of the data communication system.

Accordingly, an object of the present invention is to provide an in-line data communication system which ensures accurate data communication.

Another object of the present invention is to provide a signal level compensation system disposed in a bidirectional communication cable which connectes terminal stations.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a bidirectional communication cable (coaxial cable) is employed to connect terminal stations with each other. A signal level compensation circuit is disposed between the terminal stations and is connected to the bidirectional communication cable. The signal level compensation circuit includes first and second amplifying circuits. The first amplifying circuit is enabled and the second amlifying circuit is disabled when a data signal is transmitted in one direction within the bidirectional communication cable, thereby compensating for the signal attenuation in one direction. The first amplifying circuit is disabled and the second amplifying circuit is enabled when the data signal is transmitted in the opposing direction within the bidirection cable, thereby compensating for the signal attenuation in the opposing direction. The first and second amplifying circuits are disposed in the signal level compensation circuit in a parallel fashion with each other so that the signal level compensation circuit has a pair of terminals connected to the bidirectional communication cable.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
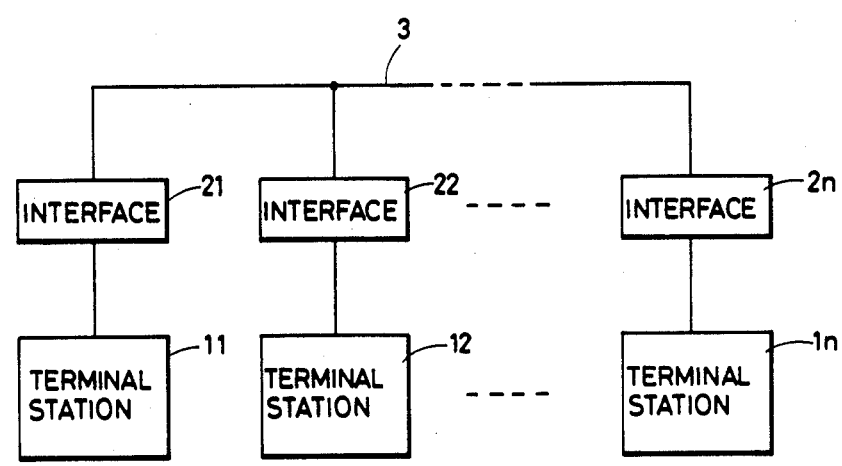
FIG. 1 is a schematic block diagram of a conventional data communication system.

FIG. 1 shows a general construction of the conventional data communication system. The data communication system generally includes a plurality of terminal stations 11, 12, - - - , and 1n. Interfaces 21, 22, - - - , and 2n are connected to each of the terminal stations 11, 12 - - - , and 1n. The interfaces 21, 22, - - - , and 2n are connected to each other via a communication cable 3 such as a coaxial cable.

An example of the above-mentioned data communication system is disclosed in U.S. Pat. No. 4,063,220, "MULTIPOINT DATA COMMUNICATION SYSTEM WITH COLLISION DETECTION," issued on Dec. 13, 1977, and U.S. Pat. No. 4,099,024, "COMMUNICATIONS NETWORK REPEATER", issued on July 4, 1978.

In such a system, attention should be directed to the fact that the impedance of the communication cable 3 becomes large as the communication cable 3 becomes long. That is, the data signal transmitted in the communication cable 3 is considerably attenuated when the terminal stations are spaced apart from each other by a long distance. The attenuation of the data signal may cause erroneous data transmission.

The present invention is a data communication system which ensures an accurate data transmission even when the terminal stations are spaced from each other by long distances.

Figure 2:
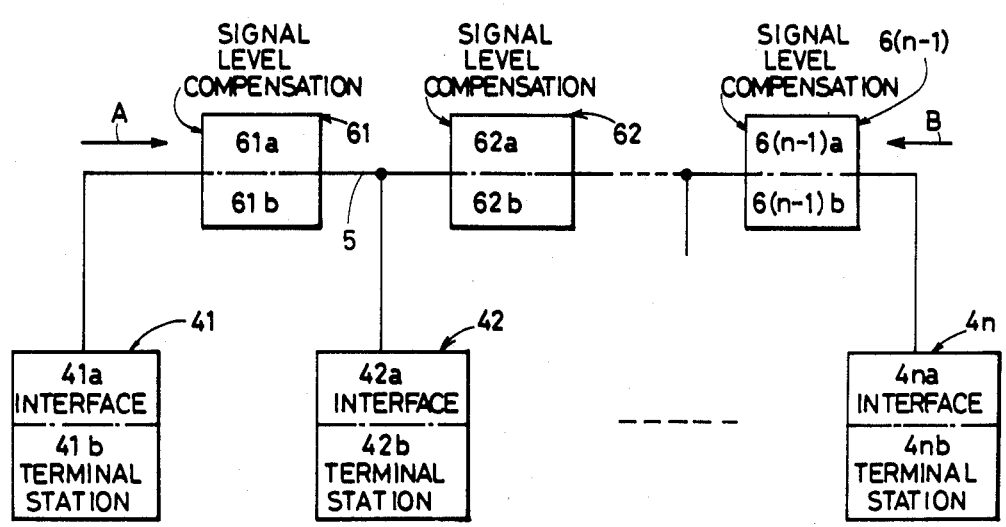
FIG. 2 is a schematic block diagram of an embodiment of a data communication system of the present invention.

FIG. 2 shows an embodiment of a data communication system of the present invention. The data communication system of the present invention includes a plurality of terminal stations 41, 42, - - - , and 4n such as electronic cash registers. Each of the terminal stations 41, 42, - - - , and 4n includes a main body 41b, 42b, - - - , or 4nb, and an interface 41a, 42a, - - - , or 4na. The terminal stations 41, 42, - - - , and 4n are connected to each other via a communication cable 5 such as a coaxial cable.

Between the terminal stations 41 and 42, a signal level compensation circuit 61 is connected to the communication cable 5. Between the terminal stations 42 and 43, a signal level compensation circuit 62 is connected to the communication cable 5. Between the terminal stations 4(n−1) and 4n, a signal level compensation circuit 6(n−1) is connected to the communication cable 5. Each of the signal level compensation circuits 61, 62, - - - , and 6(n−1) includes a first amplifying circuit 61a, 62a, - - - , or 6(n−1)a, and a second amplifying circuit 61b, 62b, - - - , or 6(n−1)b.

Since the signal level compensation circuits 61, 62, - - - , and 6(n−1) have the same constructions, the following explanation will be limited to the signal level compensation circuit 61 for the purpose of simplicity. As already discussed above, the signal level compensation circuit 61 includes the first amplifying circuit 61a and the second amplifying circuit 61b. The first amplifying circuit 61a and the second amplifying circuit 61b are connected, in the signal level compensation circuit 6, to each other in a parallel fashion. The first and second amplifying circuits 61a and 61b have signal transfer directions opposite to each other. More specifically, the first amplifying circuit 61a is enabled when the data signal is transmitted in the bidirectional communication cable 5 in one direction shown by an arrow A in FIG. 2. At this moment, the second amplifying circuit 61b is disabled so as not to perform its operation. Contrarily, when the data signal is transmitted in the bidirectional communication cable 5 in the opposing direction as shown by an arrow B, the second amplifying circuit 61b is enabled, and the first amplifying circuit 61a is disabled.

Figure 3:
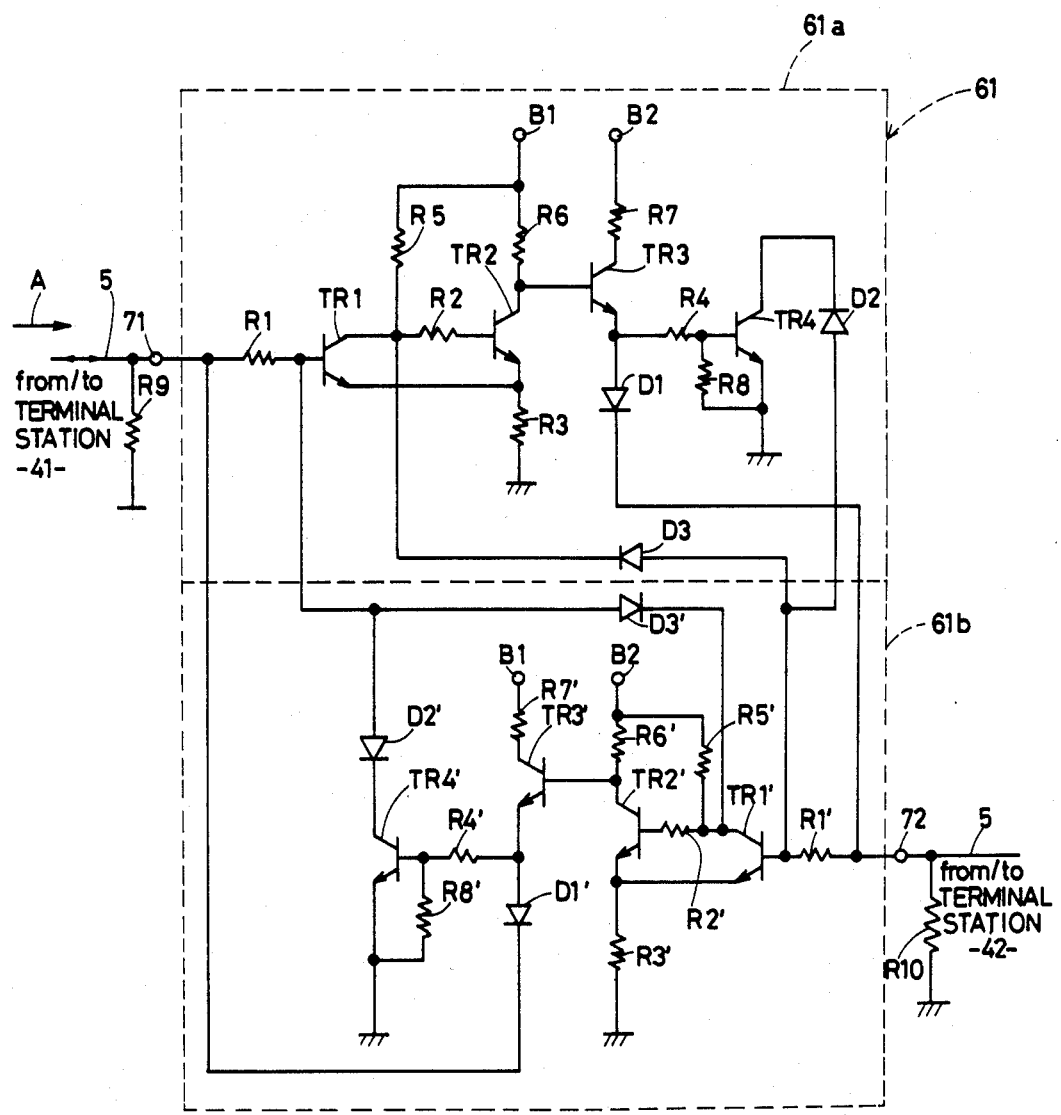
FIG. 3 is a circuit diagram of a signal level compensation circuit of the present invention included in the data communication system of FIG. 2.

FIG. 3 shows an embodiment of the signal level compensation circuit 61. As already discussed above, the signal level compensation circuits 62, - - -, and 6(n−1) have the same construction as the signal level compensation circuit 61. The signal level compensation circuit 61 includes the first amplifying circuit 61a and the second amplifying circuit 61b. The first amplifying circuit 61a is connected between a first terminal 71, which is connected to the terminal station 41 via the bidirectional communication cable 5, and a second terminal 72, which is connected to the terminal station 42 via the bidirectional communication cable 5. The second amplifying circuit 61b is connected between the first terminal 71 and the second terminal 72. That is, the first amplifying circuit 61a and the second amplifying circuit 61b are connected to each other in the parallel fashion within the signal level compensation circuit 61.

The first amplifying circuit 61a includes first through fourth transistors TR1, TR2, TR3 and TR4. The base of the first transistor TR1 is connected to the first terminal 71 via a resistor R1. The collector of the first transistor TR1 is connected to the base of the second transistor TR2 via a resistor R2. The emitter of the first transistor TR1 is connected to the emitter of the second transistor TR2. The collector of the second transistor TR2 is connected to the base of the third transistor TR3. The emitter of the second transistor TR2 is grounded via a resistor R3. The emitter of the third transistor TR3 is connected to the base of the fourth transistor TR4 via a resistor R4. The emiiter of the third transistor TR3 is further connected to the second terminal 72 via a first diode D1. The collector of the fourth transistor TR4 is connected to the collector of the first transistor TR1 via a second diode D2 and a third diode D3. The emitter of the fourth transistor TR4 is grounded. The collectors of the first and second transistors TR1 and TR2 are connected to a first power supply terminal B1 via resistors R5 and R6, respectively. The collector of the third transistor TR3 is connected to a second power supply terminal B2 via a resistor R7. A resistor R8 is connected between the base and the emitter of the fourth transistor TR4.

The second amplifying circuit 61b has the same construction as the first amplifying circuit 61a, but is constructed in the reverse direction. An apostrophe (') is added to ech element in the second amplifying circuit 61b in order to identify the relationship between the elements in the first amplifying circuit 61a. The node provided between the second and thrid diodes D2 and D3 is connected to a node provided between a resistor R1' and the base of a first transistor TR1' of the second amplifying circuit 61b. A node provided between second and third diodes D2' and D3' of the second amplifying circuit 61b is connected to the node formed between the resistor R1 and the base of the first transistor TR1. Resistors R9 and R10 are provided for impedance matching purposes. The first power supply terminal B1 and the second power supply terminal B2 in the second amplifying circuit 61b are the same terminals as the first power supply terminal B1 and the second power supply terminal B2 of the first amplifying circuit 61a, respectively.

An operational mode of the signal level compensation circuit 61 will be described with reference to FIG. 4. Now assume that a data signal is transmitted from the terminal station 41 to the signal level compensation circuit 61 via the bidirectional communication cable 5 in the direction shown by an arrow A.

Figure 4:
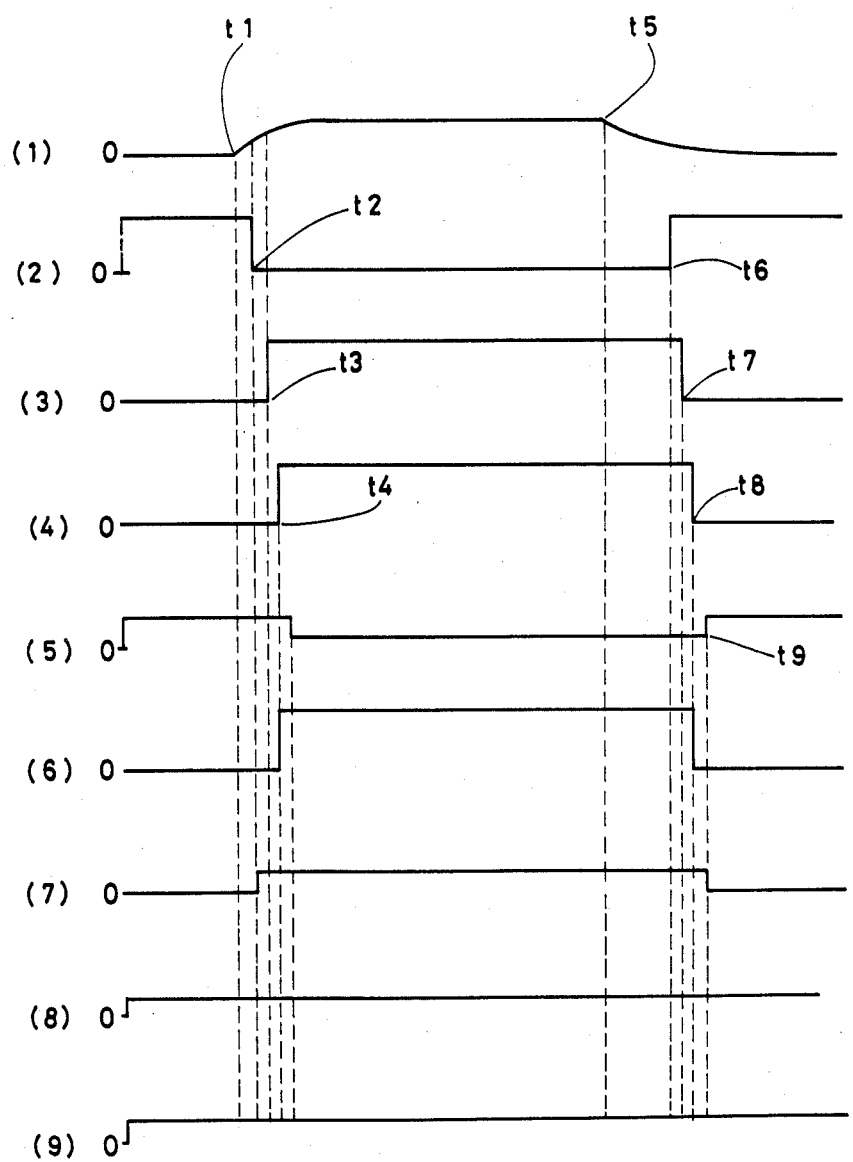
FIG. 4 is a time chart for explaining an operational mode of the signal level compensation circuit of FIG. 3.

A data signal as shown in FIG. 4-(1) is applied to the first amplifying circuit 61a via the first terminal 71 at a time t1. Even though the signal level is attenuated, the data signal takes a level, at a time t2, sufficient to turn on the first transistor TR1. Accordingly, the collector voltage of the first transistor TR1 bears the logic low at a time t2 as shown in FIG. 4-(2). In response to the switching operation of the first transistor TR1, the second transistor TR2 is turned off at a time t3 with a time delay determined by the turn-on time period of the transistor. That is, the collector voltage of the second transistor TR2 bears the logic high at a time t3 as shown in FIG. 4-(3). In response to the switching operation of the second transistor TR2, with a time delay determined by the turn-on time period of the transistor, the third transistor TR3 turns on at a time t4. Therefore, the emitter voltage of the third transistor TR3 bears the logic high at a time t4 as shown in FIG. 4-(4). The thus obtained emitter voltage of the third transistor TR3 is a data signal which is amplified and shaped from the data signal applied to the first terminal 71. The emitter voltage of the third transistor TR3 is applied to the second terminal 72 via the first diode D1, thereby being transferred to the terminal station 42 via the bidirectional communication cable 5. FIG. 4-(6) shows the data signal developed from the second terminal 72.

Since the bidirectional communication cable 5 is employed, the data signal may cycles between the first and second amplifying circuits 61a and 61b if the second amplifying circuit 61b is not disabled. That is, the second amplifying circuit 61b must be disabled before the data signal is developed at the emitter of the third transistor TR3.

In accordance with the signal level compensation circuit 61 of FIG. 3, the collector voltage of the first transistor TR1 is applied to the base of the first transistor TR1' of the second amplifying circuit 61b via the third diode D3. Thus, when the collector voltage of the first transistor TR1 bears the logic low at the time t2, the base voltage of the first transistor TR1' is held at the low level as shown in FIG. 4-(7). That is, the first transistor TR1' in the second amplifing circuit 61b is placed in the off state before the data signal is developed at the emitter of the third transistor TR3 at the time t4. Accordingly, even when the high voltage is developed at the second terminal 72 at the time t4 as shown in FIG. 4-(6), the base voltage of the first transistor TR1' of the second amplifying circuit 61b is maintained at the above-mentioned low level so as to maintain the off state of the first transitor TR1'.

As long as the first transistor TR1' is held in the off state, the second transistor TR2' in the second amplifying circuit 61b is held in the off state. Accordingly, the collector voltage of the second transistor TR2' is maintained at the low level as shown in FIG. 4-(8). The low level of the collector voltage of the second transistor TR2' is applied to the base of the third transistor TR3' in the second amplifying circuit 61b so as to maintain the third transistor TR3' in the off state. While the third transistor TR3' is held in the off state, the emitter voltage of the third transistor TR3' is held at the low level as shown in FIG. 4-(9). Thus, the first diode D1' is maintained in the off state, the cathode of the first diode D1' being supplied with the data signal shown in FIG. 4-(1). In this way, the second amplifying circuit 61b is precluded from performing its function. That is, the data signal developed from the emitter of the third transistor TR3 in the first amplifying circuit 61a will not be returned to the first amplifying circuit 61a via the second amplifying circuit 61b because the second amplifying circuit 61b is placed in the non-operating condition.

When the data signal applied to the first terminal 71 begins to change to the logic low at a time t5 as shown in FIG. 4-(1), the first transistor TR1 is turned off at a time t6. That is, the collector voltage of the first transistor TR1 bears the logic high at the time t6 as shown in FIG. 4-(2). With predetermined time delays, the second and third transistors TR2 and TR3 are placed in the off states at times t7 and t8, respectively. The collector voltage of the second transistor TR2 and the emitter voltage of the third transistor TR3 change as shown in FIGS. 4-(3) and 4-(4), respectively. Then, the fourth transistor TR4 is placed in the off state at a time t9. That is, the fourth transistor TR4 is maintained in the on state till the time t9. Accordingly, the collector voltage of the fourth transistor TR4 is maintained at the low level till the time t9 as shown in FIG. 4-(5). While the collector voltage of the fourth transistor TR4 is maintained at the low level, (till the time t9), the base voltage of the first transistor TR1' is held at the low level via the second diode D2 as shown in FIG. 4-(7), whereby the first transistor TR1' in the second amplifying circuit 61b is held in the off state. That is, at the trailing edge of the data signal applied to the first terminal 71, the second amplifying circuit 61b will not erroneously operate.

In a preferred form, the voltage level applied to the first power supply terminal B1 is 8 V, and the voltage level applied to the second power supply terminal B2 is 12 V.

When the data signal is applied from the terminal station 42 to the second terminal 72, the amplified and shaped data signal is developed from the emitter of the third transistor TR3' of the second amplifying circuit 61b and applied to the first terminal 71. The first transistor TR1 of the first amplifying circuit 61a is held in the off state to preclude the cycling of the data signal between the first and second amplifying circuits 61a and 61b.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An in-line data communication system comprising:
a first terminal station;
a second terminal station;
a bidirectional communication cable for connecting said first terminal station with said second terminal station;
said first and second terminal stations each transmitting data signals on said bidirectional communication cable independently in time; and
a signal level compensation circuit interposed in said bidirectional communication cable between first and second ends thereof, said signal level compensation circuit including;
a first amplifying circuit for amplifying a data signal transmitted in one direction from said first terminal station, said first amplifying circuit including,
a first transistor having a base connected to the first end of said bidirectional communication cable connected to said first terminal station, said first transistor further having a collector operatively connected to a voltage supply and an emitter operatively connected to ground to bias said first transistor.
a second transistor having a base connected to the collector of said first transistor, a collector operatively connected to the voltage supply and an emitter operatively connected to ground to bias said second transistor,
a third transistor having a base connected to the collector of said second transistor, a collector operatively connected to the voltage supply and an emmitter operatively connected to ground to bias said third transistor, said emitter of said third transistor developing an amplified said data signal and being connected to the second end of said bidirectional communication cable connected to said second terminal station;
a second amplifying circuit connected with said first amplifying circuit in a parallel fashion, said second amploying circuit amplifying a data signal transmitted in the opposing direction from said second terminal station, said second amplifying circuit including,
a fourth transistor having a base connected to the second end of said bidirectional communication cable connected to said second terminal station, said fourth transistor further having a collector operatively connected to the voltage supply and an emitter operatively connected to ground to bias said fourth transistor,
a fifth transistor having a base connected to the collector of said fourth transistor, a collector operatively connected to the voltage supply and an emitter operatively connected to ground to bias said fifth transistor,
a sixth transistor having a base connected to the collector of said fifth transistor, a collector operatively connected to the voltage supply and an emitter operatively connected to ground to bias said sixth transistor, said emitter of said sixth transistor developing an amplified said data signal and being connected to the first end of said bidirectional communication channel connect to said first terminal station; and
inhibition means for disabling said second amplifying circuit in response to receipt of the data signal transmitted in said one direction, and for disabling said first amplifying circuit in response to receipt of the data signal transmitted in said opposing direction, said inhibition means including, first means for disabling operation of said second amplifying circuit before the beginning of transmission of an amplified data signal from said first amplifying circuit to said second terminal station when the data signal is transmitted in said one direction, said first means for disabling including, a first clamping line interconnecting said collector of said first transitor to said base of said fourth transistor, said first clamping line having a first diode interposed therein, said first diode being arranged to prevent current flow on said first clamping line from said second amplifying circuit to said first amplifying circuit, second means for disabling operation of said first amplifying circuit before the beginning of transmission of an amplified data signal from said second amplifying circuit to said first terminal station when the data signal is transmitted in said opposing direction, said second means for disabling including, a second clamping line interconnecting said collector of said fourth transistor to said base of said first transistor, said second clamping line having a second diode interposed therein, said second diode being arranged to prevent current flow on said second clamping line from said first amplifying circuit to said first amplifier circuit, third means for disabling operation of said second amplifying circuit until after the completion of the transmission of said amplified data signal from said first amplifying circuit when said data is transmitted in said one direction, said third means for diabling including, a seventh transistor having a base connected to said emitter of said third transistor and an emitter connected to ground, and a third clamping line interconnecting said collector of said seventh transistor and said base of said fourth transistor, said third clamping line having a third diode interposed therein, said third diode being arranged to prevent current flow on said third clamping line from said second amplifying circuit to said first amplifying circuit, fourth means for disabling operation of aid first amplifying circuit until after the completion of the transmission of said amplified data from said second amplifying circuit when said data is transmitted in said opposing direction, said fourth means for disabling including, an eighth transistor having a base connected to said emitter of said sixth transistor and an emitter connected to ground, and a third clamping line interconnecting said collector of said eighth transistor and said base of said first transistor, said third clamping line having a fourth diode interposed therein, said fourth diode being arranged to prevent current flow on said fourth clamping line from said first amplifying circuit to said second amplifying circuit.

* * * * *